(12) United States Patent
Mundheim

(10) Patent No.: US 12,110,241 B2
(45) Date of Patent: Oct. 8, 2024

(54) COMPOSITIONS AND METHOD FOR REMOVING IMPURITIES FROM A FLUID STREAM

(71) Applicant: M Vest Water AS, Bergen (NO)

(72) Inventor: Atle Mundheim, Omastrand (NO)

(73) Assignee: M Vest Water AS, Bergen (NO)

( * ) Notice: Subject to any disclaimer, the term of this patent is extended or adjusted under 35 U.S.C. 154(b) by 515 days.

(21) Appl. No.: 16/493,312

(22) PCT Filed: Mar. 2, 2018

(86) PCT No.: PCT/IB2018/051337
§ 371 (c)(1),
(2) Date: Sep. 12, 2019

(87) PCT Pub. No.: WO2018/167598
PCT Pub. Date: Sep. 20, 2018

(65) Prior Publication Data
US 2020/0039851 A1    Feb. 6, 2020

(30) Foreign Application Priority Data
Mar. 14, 2017   (NO) ................................. 20170373

(51) Int. Cl.
*C02F 1/56* (2023.01)
*C02F 1/40* (2023.01)
*C02F 1/52* (2023.01)
*C02F 103/36* (2006.01)

(52) U.S. Cl.
CPC .............. *C02F 1/56* (2013.01); *C02F 1/40* (2013.01); *C02F 1/5227* (2013.01); *C02F 1/5263* (2013.01); *C02F 2103/365* (2013.01)

(58) Field of Classification Search
CPC ...................................................... C02F 1/56
See application file for complete search history.

(56) References Cited

U.S. PATENT DOCUMENTS

| 4,565,635 | A | | 1/1986 | Le Du |
| 5,717,023 | A | * | 2/1998 | Batty ................... C02F 1/5227 524/378 |
| 2007/0235391 | A1 | | 10/2007 | Ylikangas |
| 2013/0256235 | A1 | | 10/2013 | Kneib |

FOREIGN PATENT DOCUMENTS

| CN | 101838041 | 9/2010 |
| CN | 105712451 | 6/2016 |
| EP | 2502971 | 9/2012 |
| GB | 2364047 | 1/2002 |

OTHER PUBLICATIONS

Avery, Burkholder and Gruenerfelder, "Use of Crosslinked xanthan gels in actual profile modification field projects", Society of Petroleum Engineers 14114, 1986 pp. 559-561 XP009505881.

* cited by examiner

*Primary Examiner* — Peter Keyworth
(74) *Attorney, Agent, or Firm* — Christian D. Abel

(57) ABSTRACT

A product and method are disclosed for the removal of contamination from a water flow in which the product according to the invention blended into a contaminated water flow gather contamination to large easily separable agglomerates. A use of product and method for separation of contamination from water is also disclosed.

12 Claims, No Drawings

COMPOSITIONS AND METHOD FOR REMOVING IMPURITIES FROM A FLUID STREAM

The present invention relates to a product composition and a method for removal of undesirable contamination from a continuous fluid flow by blending the product composition into the continuous fluid flow, as presented in the introduction to the following claim 1.

More specifically, the invention relates to a composition of a product for the removal of undesired contaminants in process water where the product composition consists of an water free fluid in which it is dispersed a powdered polysaccharide or mixture of polysaccharides and wherein there is also dispersed one or more types of powdered multivalent cations which in a water dissolved state have the property of crosslinking the polysaccharide when the polysaccharide is water dissolved, wherein neither dispersed powdered polysaccharide nor dispersed powdered multivalent cation is dissolved in the dispersion liquid, and further where both polysaccharide and multivalent cation have the properties to be water dissolved. Thus, the invention relates to a product in which particulate undissolved polysaccharide and particulate undissolved crosslinking cations are present in a dispersion liquid wherein insolubility causes crosslinking not to occur in the product.

Further, the invention relates to a composition of a product in which the particulate unsolved polysaccharides and particulate unsolved crosslinking cations are dispersed in a water free fluid wherein one or more viscosity promoting compounds are added so that particulate unsolved present compounds are kept unsolved in a stable suspension.

Further, the invention relates to a product in which particulate unsolved polysaccharides and particulate unsolved crosslinking cations are added to a heated water free fluid, which when cooled becomes solid state form, wherein the said particulate unsolved components are evenly distributed.

Further, the invention relates to a product where the product consists of unsolved and particulate polysaccharides in a cooled and solidified dispersion fluid for the mixture, can be processed by known technology to granulates or pellets.

Furthermore, the invention relates to in-dosing and mixing of the product into a contaminated water containing fluid flow, reaction with the contamination, and subsequent removal of reacted polysaccharides and multivalent cations and contamination from the contaminated fluid flow.

The invention also relates to applications of the product and procedure for said processes.

The invention relates to the technology that removes contamination in process water flow, by addition of polysaccharide that encapsulates contaminations in the water, whereupon multivalent cations crosslinks the polysaccharide-chains in such a way that these become gelled state and gather the contaminating particles in the water large and easily separable conglomerates. According to the present product invention, is this achieved by simultaneously in-dosing of a product comprising unsolved polysaccharides and unsolved multivalent cations which jointly are dispersed into a water free dispersion-fluid which does not dissolve the said particulate components.

The invention is also related to being able to inject polysaccharide dispersed in an undissolved state simultaneously with dispersed crosslinking undissolved cations without that crosslinking takes place prior to that the polysaccharide is dissolved in the process water flow and encapsulate contaminations in the process water flow, by that such water solubilization and encapsulation of contaminants in the process water flow of polysaccharides takes place prior to that the crosslinking cations, which was simultaneously dosed in, do dissolve in the process water flow.

The invention also relates to use of the product and procedure according to the invention, for improved separation of undesired contamination in a process water flow.

Known Products and Methods in Use Today:

It is known that there exist a number of polysaccharides/hydrocolloids that crosslink with multivalent cations. This includes products from marine plants, terrestrial plants, microbial polysaccharides and polysaccharide derivatives, such as Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene Glycol Alginate, Pectin, Curdlan, Hydroxypropyl Guar, Tamarind seed gum and Pullulan.

It is known that several of these products are applied for creating viscosity and emulsion stability in different products in the food industry, cosmetics industry, oil industry in addition to several general industrial applications.

It is also known that a method for preventing lumping when dissolving polysaccharides in water is to disperse them in oil or alcohol or glycerol.

It is further well known that said polysaccharides can be crosslinked to gel by using gallants, including multivalent ions.

From the oil industry it is known that polysaccharides can be used as viscosity promoting additive in fracturing fluids, drilling fluids and completion fluids. In drilling fluids they also function as emulsion stabilizers in oil-based drilling mud, and they do due to their thixotropic properties have the properties to keep solids in suspension upon no circulation.

The applications in the oil industry comprises that the polysaccharides are pre-dissolved and stabilized by cross-linking in the drilling, completion and fracturing fluids.

It is also known that anionic polysaccharides/hydrocolloids can be used in process water treatment to improve separation of contaminants by adding them water dissolved in a water-dilute solution into a process water stream, after which they are reacted with multivalent cations to crosslinking, whereby flocculation into large easily separable conglomerates of contamination and polysaccharide takes place.

It is known that by substantial water dilution and instantaneous mixing premature gelling premature gelling can be avoided, that is, that crosslinking takes place before polysaccharide chains contact contaminants in the process water where active multivalent cations are present. In particular, this is known from the use of alginates, carrageenan and pectin, which crosslink with divalent cations. It is also known that such divalent cations are present in most produced water compositions that relate to oil reservoir production of oil/gas/water mixtures.

It is also known that such premature gelling can be prevented by applying retarding chemicals combined with injection, in addition to that activating chemicals can be used where inactivated multivalent cations exist.

It is also known that in water with a high content of cations and salts, high water dilution and heavily water diluted solved polysaccharide are used by injection. It is known that one can cause the various polysaccharides in water-solved state and injected to encapsulate contamination, then flocculate contamination by crosslinking by a new injection and blending of dissolved or undissolved water-soluble multivalent cation.

It is also known that many present components in produced water from oil-reservoirs contains natural or added substances that inhibits crosslinking of water-disolved polysaccharide with divalent cations. Typical natural inhibitors are hydrogen carbonate and typically added inhibitors are scale inhibitors. Both of these occupies one or more of the free valences of the cations. For linking to a polysaccharide, it is sufficient with 1 free valence in the cation, such as for example in Ca2+, but to crosslink two polysaccharides, at least two valences must be free of crosslinking.

DETAILED DESCRIPTION OF THE INVENTION

It is an objective of the invention to provide a product for injection into a contaminated water flow in order to remove dissolved and/or insoluble organic and/or inorganic contaminants from a fluid flow, where the product consisting of an anhydrous fluid in which it is dispersed a powdered polysaccharide or mixture of polysaccharides having the property of crosslinking with multivalent cations and wherein it is also dispersed one or more types of powdered multivalent cations which in a water dissolved state have the ability to crosslink the polysaccharide when the polysaccharide is water dissolved, where in neither dispersed pulverized polysaccharide or dispersed powdered multivalent cation is dissolved in the dispersion fluid and further where both polysaccharide and multivalent cation are water soluble and will be dissolved by blending in a contaminated water stream but then so that the dissolution speed in contaminated water flow is faster for polysaccharide than for crosslinking cations so that dissolution occurs with sufficient time difference in dissolution rate in order for polysaccharide to encapsulate contamination in the fluid flow before multivalent cation dissolves in the contaminated water stream and crosslink dissolved polysaccharide attached on contaminant.

It is further an object of the invention to provide a product for injection into a contaminated water flow for the removal of dissolved and/or insoluble organic and/or inorganic impurities from a fluid flow by that the pulverized polysaccharide consists of one or more of Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene Glycol Alginate, Pectin, Curdlan, Hydroxypropyl Guar, Tamarind seed gum and/or Pullulan, where of preferred polysaccharide is Xanthan.

It is a further an objective of the invention to provide a product for injecting into a contaminated water flow for the removal of dissolved and/or undissolved organic and/or inorganic contaminants from a fluid flow, which product comprises unprocessed powdered cation consisting of one or more water soluble multivalent cations which when dissolved in water is crosslinking water dissolved polysaccharides, where preferred cation is, but not limited to, a trivalent cation composition of aluminium, iron or chromium.

It is further an objective of the invention to provide a product for dosing into a contaminated water stream for the removal of dissolved and/or insoluble organic and/or inorganic contaminants from a fluid flow, wherein a dispersion fluid is a nonpolar organic, or mineral, or synthetic oil immiscible with water, or an alcohol.

It is further an object of the invention to provide a product for the removal of dissolved and/or insoluble organic and/or inorganic contaminants from a fluid flow, characterized in that there is added known viscosity promoting agent to maintain particulate material in a uniform suspension in the dispersion liquid.

It is further an object of the invention to provide a product for the removal of dissolved and/or undissolved organic and/or inorganic contaminants from a fluid flow, where the dispersion fluid is liquid having a melting temperature at 20-80 degrees Celsius for the addition of polysaccharide, cations and optional viscosity promoter, where after addition the product is cooled to below melting point and processed to solid state substrates, pellets or granules.

It is a further object of the invention to provide a product for the removal of dissolved and/or insoluble organic and/or inorganic contaminants from a fluid flow, where in cross-linking cation by known technologies, such as, but not limited to coating, is modified to dissolve more slowly in water than the polysaccharide.

It is a further an objective of the invention to provide a product for the removal of dissolved and/or undissolved organic and/or inorganic contaminants from a fluid flow in where the product according to the invention is dosed in and blended into a contaminated water containing fluid flow whereby polysaccharide in the first time interval dissolve and in necessary proportion bond to contaminants in water, and where upon it in a second time interval takes place a water dissolution of the products cross-linking cations, followed by subsequent agglomeration of contaminants and cross-linked polysaccharide. during which there is a water solution of the cross-linking cations of the product with subsequent agglomeration of contaminant and cross-linked polysaccharide.

It is an object of the invention to provide a product for the removal of dissolved and/or undissolved organic and/or inorganic contaminants from a fluid flow in which the product according to the invention is dosed in and blended into a contaminated water fluid flow where fluid temperature is higher than a melting point of the according to the invention solidified dispersion fluid where upon in the first time interval the solidified dispersion fluid melts, where after in the second time interval the polysaccharide is dissolved in the water and the required proportion thereof bond to contaminants in the water, where after in a third time interval water dissolution of the products cross-linking cations takes place with subsequent agglomeration of pollution and cross linked polysaccharide.

It is a further object of the invention to provide a product for the removal of dissolved and/or insoluble organic and/or inorganic contaminants from a fluid flow, where it is dosed in and blended 1-1000 ppm of the product in the contaminated fluid flow, whereas a preferred injection is 1-50 ppm, and t a more preferred injection is 1-20 ppm.

It is also an objective to provide an application of the product and method according to the invention as an oil/water/particle separation promoting agent in a contaminated water flow where water comes from an oil production reservoir and is to be purified for discharge to the sea or purified for re-injection into the reservoir.

It is also an objective to provide an application of the product and method according to the invention as an oil/water/particle separation promoting agent from a contaminated water flow where water comes from well operations in connection with oil and gas production or drilling for oil or gas.

It is also an objective to provide an application of the product and method according to the invention as an oil/water/particle separation promoting agent from a contaminated water stream where water is waste water from drilling and/or production ships, floating or fixed platforms, or from oil-related land-based operations.

It is also an object to provide an application of the product and method, according to the invention as an oil/water/particle separation promoting agent from a contaminated water stream where water is waste water or process water in/from refineries or petrochemical industry.

It is also an objective to provide an application of the product and method according to the invention as an separating agent for the separation of organic and inorganic contamination from a contaminated water flow from industrial or municipal wastewater.

It is also an objective to provide an application of the product and method according to the invention as a separating agent for improved separation of organic and inorganic contamination in a water flow where the product is used prior to separation into one or more of cyclones, flotation device/process, sedimentation device/process, mechanical filter device/process, media filter device/process, membrane filter/process, reverse osmosis device/process, centrifuge device/process and/or decanter device/process, UV treatment device/process, evaporation device/process, electrolysis device/process The product, methods and uses of the invention are characterized by the features which are apparent from the features of the following independent claims.

Further features of the invention are set forth in the dependent claims.

According to the present invention it is provided a new and improved product for dosing into a contaminated water stream for the removal of dissolved and/or insoluble organic and/or inorganic impurities from a liquid stream, where the product comprise an anhydrous liquid in which it is dispersed a powdered polysaccharide or mixture of polysaccharides having the property of crosslinking with multivalent ions and wherein there is also dispersed one or more types of powdered multivalent cations which in a water dissolved state have the property of crosslinking the polysaccharide when the polysaccharide is water dissolved, where in neither dispersed powdered polysaccharide nor dispersed powdered multivalent cation is dissolved in the dispersion liquid and further where both polysaccharide and multivalent cation are water soluble and will be dissolved by blending into a contaminated water stream but then so that the dissolution speed in contaminated water flow is faster for polysaccharide than for crosslinking cations so that o dissolution occurs with sufficient time difference in dissolution in order for polysaccharides to encapsulate contamination in the liquid flow before multivalent cation dissolves in the contaminated water flow and cross-link dissolved polysaccharide bonded to contaminant.

According to the present invention it is provided a new and improved product for into a contaminated water flow for the removal of dissolved and/or insoluble organic and/or inorganic contamination from a fluid flow, by that the pulverized polysaccharide consists of one or more of Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene glycol Alginate, Pectin, Curdlan, Hydroxypropyl Guar, Tamarind Seed gum and/or Pullulan, where preferred polysaccharide is Xanthan.

According to the present invention it is provided a new and improved product for dosing into a contaminated water flow for the removal of dissolved and/or insoluble organic and/or inorganic impurities from a liquid stream, which comprises undissolved powdered cations consisting of one or more water soluble multivalent cations which when dissolved in water crosslink the water dissolved polysaccharide, where preferred cation is, but not limited to, a trivalent cation composition of aluminium, iron or chromium.

According to the present invention it is provided a new and improved product for dosing into a contaminated water flow for the removal of dissolved and/or insoluble organic and/or inorganic contaminants from a liquid stream wherein a dispersion liquid is a nonpolar organic or mineral or synthetic oil immiscible with water, or an alcohol.

According to the present invention it is provided a new and improved product for the removal of dissolved and/or undissolved organic and/or inorganic contaminants from a fluid flow, in which there is added a known viscosity promoting agent for keeping particulate material in a uniform suspension in the dispersion fluid.

According to the present invention, it is provided a new and improved product for removal of dissolved and/or undissolved organic and/or inorganic contaminants from a fluid flow, in which the dispersion medium is a fluid with melting point 20-80 degrees Celsius, by the addition of polysaccharides, cations, and possibly viscosity promoter, where after the product is cooled to below the melting temperature and processed to solid substrates, pellets or granulates.

According to the present invention, it is provided a new and improved product for removal of dissolved and/or undissolved organic and/or inorganic contaminants from a fluid flow, in which crosslinking cations by prior art, such as but not limited to coating, is modified to be dissolved in water later than polysaccharides.

According to the present invention, it is provided a new and improved product for removal of dissolved and/or undissolved organic and/or inorganic contaminants from a fluid flow, where the product according to the invention, is injected into a contaminated water based fluid flow whereby polysaccharide in first time interval is dissolved in water and the necessary proportion of water dissolved polysaccharide bonds to contamination in water, where after in a second time interval water dissolution of cross-linking cations of the product takes place with subsequent agglomeration of contamination and cross-linked polysaccharide occurs.

According to the present invention it is provided a new and improved product for the removal of dissolved and/or undissolved organic and/or inorganic contaminants from a fluid flow in which the product of the invention is dosed in and is blended into a contaminated aqueous fluid flow with a fluid temperature higher than a melting point for the, according to the invention, solidified dispersion fluid whereby solidified dispersion fluid is melted in the first time interval, where after in the second time interval polysaccharide is dissolved in the water and the necessary proportion of water-soluble polysaccharide bonds to contamination in water, and where after it in the third time-interval takes place water dissolution of the crosslinking cations of the product with subsequent agglomeration of contamination and cross-linked polysaccharide.

According to the present invention it is provided a new and improved product for the removal of dissolved and/or undissolved organic and/or inorganic contaminants from a fluid flow which is dosed in and blended 1-1000 ppm of the product in the contaminated fluid flow, where a preferred injection is 1-50 ppm, and a more preferred injection is 1-20 ppm.

According to the present invention, it is provided an application of the product and method of the invention for an oil/water/particle separation promoting agent from a contaminated water stream where water comes from an oil producing reservoir and is to be purified for discharge to sea or purified for re-injection into the reservoir.

According to the present invention, it is disclosed an application of the product and method of the invention as an oil/water/particle separation promoting agent from a contaminated water flow where water comes from well operations in connection with oil and gas production or drilling for oil or gas.

According to the present invention, it is disclosed an application of the product and method according to the invention as an oil/water/particle separation promoting agent from a contaminated water flow where water is waste water from drilling and/or production ships, floating or solid platforms, or from oil-related land-based operations.

According to the present invention, it is disclosed an application of the product and method of the invention as an oil/water/particle separation promoting agent from a contaminated water stream where water is waste water or process water in/from refineries or petrochemical industries.

According to the present invention, it is disclosed an application of the product and method of the invention as a separating agent for the separation of organic and inorganic contamination from a contaminated water flow from industrial or municipal wastewater.

According to the present invention it is disclosed an application of the product and method of the invention as a separating agent for improved separation of organic and inorganic contamination in a water flow where the product is used prior to separation in one or more of cyclones, flotation device/process, sedimentation device/process, mechanical filter device/process, media filter device/process, membrane filter/process, reverse osmosis device/process, centrifuge device/process and/or decanter device/process, UV treatment device/process, evaporation device/process, electrolysis device/process.

The invention is characterized in that the product consists of an anhydrous fluid in which it is dispersed a powdered polysaccharide or mixture of polysaccharides which has the property of crosslinking with multivalent ions, and wherein there is also dispersed one or more types of powdered multivalent cations which when water dissolved have the ability to crosslink the polysaccharide when the polysaccharide is water dissolved in which neither dispersed powdered polysaccharide nor dispersed powdered multivalent cation is dissolved in the dispersion liquid and further where both polysaccharide and multivalent cation are water dissolvable and will be dissolved by blending in a contaminated water stream but then so that dissolution speed in contaminated water flow is faster for polysaccharide than for crosslinking cations so that dissolution occurs with sufficient time difference in dissolution speed so that polysaccharide encapsulates contamination in liquid flow before multivalent cation dissolves in contaminated water flow and crosslinked dissolved polysaccharide bonded to contamination.

Further, the product is characterized in that powdered polysaccharide consists of one or more of Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene Glycol Alginate, Pectin, Curdlan, Hydroxypropyl Guar, Tamarind seed gum and/or Pullulan, where preferred polysaccharide is Xanthan.

Further, the product is characterized in that powdered undissolved cations consists of one or more water dissolvable multivalent cations which when dissolved in water crosslinks water dissolved polysaccharide, where preferred cation is, but is not limited to, a trivalent cation composition of aluminium, iron or chromium.

Further, the product is characterized by the dispersion fluid being a nonpolar organic or mineral or synthetic oil immiscible with water, or an alcohol.

Further, the product is characterized by the addition of known viscosity promoter to keep particulate material in even suspension in the dispersion liquid.

Further, the product is characterized by the dispersion fluid is liquid having a melting point of 20-80 degrees Celsius at time of addition of polysaccharide, cations and possibly viscosity promoter, where after the product being cooled to below the melting point and processed to a solid state, substrates, pellets or granulates.

Further, the product is characterized by crosslinking cation by known technologies, such as but not limited to coating, are modified to dissolve later in water than polysaccharide.

The method is characterized in that the product according to the invention is dosed in and blended into a contaminated aqueous fluid flow whereby polysaccharide is dissolved in water during the first time interval and the necessary proportion of water-dissolved polysaccharide bonds to the contamination in water, and in a second time interval a water dissolution of the cross-linking cations of the product takes place with subsequent agglomeration of contamination and cross-linked polysaccharide.

The method is characterized in that the product according to the invention is dosed in and blended into a contaminated aqueous fluid with a fluid temperature higher than a melting point of the according to the invention solidified dispersion fluid whereby the solidified dispersion fluid is melted during the first time interval, where after in a second time interval the polysaccharide are dissolved in water and the necessary proportion water dissolved polysaccharide bonds to the contamination in water, where after in a third time interval a water dissolution of the cross-linking cations of the product takes place with subsequent agglomeration of contamination and cross-linked polysaccharide.

The process is characterized by dosing in and blending 1-1000 ppm of the product into the contaminated liquid stream, where a preferred dosing is 1-50 ppm, and a more preferred injection is 1-20 ppm.

The use of the product and method according to the invention is for oil/water/particle separation from a contaminated water flow where water comes from an oil producing reservoir and is to be cleaned for discharge to the sea or cleaned for re-injection into the reservoir.

The use of the product and method according to the invention is for oil/water/particle separation from a contaminated water flow where water comes from well operations in connection with oil and gas production or drilling for oil or gas.

The use of the product and the process according to the invention is for oil/water/particle separation from a contaminated water flow where water is waste water from drilling and/or production ships, floating or solid platforms or from oil-related land-based operations.

The use of the product and method according to the invention is for oil/water/particle separation from a contaminated water flow where water is waste water or process water in/from refineries or petrochemical industry.

The use of the product and method according to the invention for separation of organic and inorganic contamination from a contaminated water flow from industrial or municipal wastewater.

The use of the product and method according to the invention is for improved separation of organic and inorganic contamination in a water flow applied prior to separation in one or more of cyclones, flotation device/process, sedimentation device/process, mechanical filter device/process, media filter device/process, membrane filter/process, reverse osmosis device/process, centrifuge device/process and/or decanter device/process, UV treatment device/process, evaporation device/process, electrolysis device/process.

Advantages of Present New Method

The present product has the advantage that it can be dosed at highly concentrated into a large flow of produced water or process water. A slurry consisting of dispersed polysaccharide and pulverized multivalent cations in a dispersion fluid, potentially also containing viscosity regulating/promoting additive, can as an example contain 50 weight % dry material in a dispersion fluid of oil or alcohol. This means that 20 ppm injected product results in 5 ppm polysaccharide and 5 ppm multivalent cation crosslinking reagent and 10 ppm dispersion fluid. A field with 100 000 m3 produced water production a day therefore requires about 2 m3 product/day. Correspondingly, by use of water dissolved polysaccharide such as Alginate, will require large amounts of potable water since this must be diluted to 0.05% with potable water according to prior art. The mentioned case will require 1000 m3 potable water/day for dilution. This is a large water consumption for an oil platform, and in many countries an unthinkable consumption of potable water. The present invention does not use potable water.

Furthermore, prior art requires two dosing stations and locations, and two blending devices. In the oil industry this requires significant modifications, and logistically it is highly undesirable to use 2 chemicals if it is possible to use 1. The present invention requires only 1 dosing and blending system and simplifies the logistics considerably since both reactant and polysaccharide coexist in the same dispersion fluid. In the present product composition powdered polysaccharides can be dissolved in saline water and hot water, and it can be used for directly dissolving in the produced water flow of high salinity and divalent ion content. For example, Xanthan can be used since Xanthan does not react with divalent cations, and it can be dissolved in high salinity water. When dispersed in oil or alcohol, Xanthan will be dissolved in 1-2 seconds in the process water with adequate mixing. By adding trivalent cations of aluminium, iron or chromium that dissolves after more than 2 seconds in water, will water dissolved Xanthan bond to the contamination in the water, and will in the following seconds react with crosslinking cations. It is not known that Xanthan has been used for cleaning of water in the oil industry. Of all natural polysaccharides, Xanthan is the most widely used in the oil industry, but exclusively used for other purposes than water cleaning. It is however, 10 times cheaper than the known polysaccharides used for water cleaning, and the present invention represent therefore great economical savings for the industry.

It is known that natural polysaccharides have a short life time due to biological activity when dissolved in water. A maximum of 2-3 weeks shelf life for flocculating natural polysaccharide is common. In the present invention, polysaccharides are not dissolved, and the lifetime is as in dry state or better. That is, more than 2 years of lifetime.

In the present invention, a product and method are provided which has great economic, practical, logistic and environmental advantages over prior art.

The present invention has the advantage that the products are without harmful effect on the marine environment.

Furthermore, the present invention has the advantage that all injected products are reacted and separated by proper stoichiometric formulation of polysaccharide and crosslinking cationic reactant. That is, no emissions to the marine environment or no supply of surplus flocculant in the reservoir if water is reinjected under/in the oil reservoir. Conventional flocculants yield surpluses that follow the water phase at sea or to reservoir with potentially large harmful effects.

The preferred, according to the invention, Xanthan and the crosslinking with trivalent cations has the advantage to prior art that it undissolved in dispersed state can be dissolved directly in produced water from the oil reservoir since crosslinking trivalent cations are not present in such water. It is a great advantage that trivalent cations according to the invention are not inhibited by known produced water chemical additives or natural chemical composition of the water.

Other existing cations in such water have no crosslinking effect on Xanthan before pH exceeds 9.5 which is never applicable to produced water from a reservoir.

The present invention is characterized in that a fluid is added to undissolved polysaccharide and undissolved crosslinking multivalent cations dispersed in the anhydrous dispersion fluid. The dispersion fluid can be a nonpolar oil or an alcohol. The product is then blended into and brought into contact with contamination in a water flow. The water first dissolves polysaccharide and then the crosslinking cations. Cross-linked polysaccharide and contamination can then be easily separated from the water flow.

The product may also be added a known viscosity promoter such as modified oregano clay, fumed silica, lithium or similar. This is to keep the polysaccharide particles and particles of crosslinking cationic product in a uniform suspension.

Furthermore, the product can be solidified by using a heated dispersion liquid in which the described powdered dry matter is added at a temperature above the melting point of the liquid. The liquid can then be cooled, and the product may then be in solid state, pellets or granules. Typical example of such solidification would be to use a wax paraffin with melting point at 40-50 degrees Celsius where the finished solidified product upon blending in a stream of produced water would melt when the produced water typically has a temperature around 70 degrees Celsius. This product composition may be used in hot process water that melts the wax.

The product and method of the invention will be further explained in the following description with reference to examples wherein:

Production of Product for Testing;

Product A 1 litre of nonpolar dearomatized aliphatic oil was added 250 gr of fine grained Xanthan and 250 gr of fine grained Al2(SO4)3. The mixture was then added silica to increase the viscosity. The mixture was maintained as a homogeneous suspension by slow stirring.

Product B 1 litre of mono ethylene glycol was added 250 grams of fine grained Xanthan and 250 gr of fine grained Al2(SO4)3. The mixture was then added silica to increase the viscosity. The mixture was kept a homogeneous suspension during the tests by slow stirring.

Product C 1 litre of liquid paraffin wax with melting point 50 degrees Celsius was added 250 gr of fine grained Xanthan and 250 gr of fine grained Al2(SO4)3 during gentle stirring. The mixture of suspended powder and liquid wax was cooled below melting temperature to become solid but soft. The product was then extruded through a perforated plate, where after a knife cut the extruded wax with pulverized solids into 2 mm long pellets. The pellets were further cooled so they obtained a hard and more solid consistence.

Production of Stock Solution of Synthetic Water with Oil Emulsion;

20 litres of synthetic water were made with salinity 12%, in which in addition to NaCl2, 4000 ppm NaSO4 and 2000 ppm CaCl2, 500 ppm NaCO3 and 1000 ppm BaCl2 and 10 ppm MgCl2 were added. 4000 ppm crude oil was shear blended with a turax to obtain a microemulsion Test 1

3 glass beads each containing 1 litre stock solution with produced water was added 20 ppm respectively Product A, B, and C during fast stirring. The temperature of stock solution was 40 degrees Celsius.

Product A and B responded immediately and created flocculation by crosslinking. After a few seconds, the water was transparent, and all contaminants were cross-linked and flocculated on the surface of the fluids.

Product C did not respond as it did not dissolve at 40 degrees Celsius.

Test 2

In experiment 2, experiment 1 was repeated except that the temperature of the stock solution was 70 degrees Celsius. Now all 3 products flocculated equally well. After a few seconds all oil was flocculated, and the water was completely transparent. Analysis were made of water phase and all three products resulted in oil water analyses which showed less than 1 ppm of free oil remaining in the water phase after flocculation by crosslinking.

In experiment 3 experiment 2 was repeated but with temperature 90 degrees Celsius. The best results were obtained using product C, and one observed incomplete dissolving of polysaccharides for products A and B. This shows that at such high temperature cross-linking cations dissolve before polysaccharide is dissolved and the process works less well.

In experiment 4, the grain size of crosslinking cation powder was increased, and the Xanthan powder size was similar to previous experiments. At a temperature of 90 degrees Celsius, all samples again worked optimal. All three products flocculated within seconds and this shows that increase in grain size of crosslinking cation powder increases dissolution time at high temperatures so that polysaccharide resolves before cations become active.

In experiment 5 crosslinking cationic fine powder was impregnated with a silicone-based impregnation. No flocculation occurred at regular stirring as in experiments 1-4. One then exposed the mixtures for shear forces by blending with turax for 2 seconds. All three samples flocculated immediately. By shearing, crosslinking cationic powder broke so that impregnated surface was broken, and aqueous phase dissolution occurred. This shows that by impregnation of cationic crosslinkers, shear mixing needs to bring cations into water dissolved state.

The invention claimed is:

1. A product for dosing into a contaminated water flow for the removal of organic and/or inorganic contamination, comprising an anhydrous liquid into which is dispersed and not dissolved:
   a. a powdered, water soluble anionic polysaccharide or a mixture of anionic polysaccharides of one or more of Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropylcellulose, Furcellaran, Karaya gum, Whelan gum, Hydroxyethyl cellulose, Locust bean gum, Xanthan gum, Propylene Glycol Alginate, Pectin, Curdlan, Hydroxypropyl Guar, Tamarind seed gum and/or Pulluan, where the polysaccharide or polysaccharides are of the type that when dissolved in water are capable of crosslinking with multivalent cations, and
   b. one or more powdered, water soluble multivalent cations, said multivalent cations capable of cross linking with the polysaccharide when the polysaccharide is dissolved in water,
   c. wherein the polysaccharide and the multivalent cations are dispersed together into, but not dissolved in, the anhydrous liquid, and,
   d. further where the anhydrous liquid is in the form of a non-polar organic oil or mineral oil or synthetic oil immiscible with water, or where the anhydrous liquid is an alcohol.

2. The product according to claim 1, where the one or more multivalent cations is a trivalent cation composition of aluminum, iron or chromium.

3. The product according to claim 2 wherein the anionic polysaccharide is Xanthan.

4. The product according to claim 1, characterized in that the anionic polysaccharide has a speed of dissolution in a water flow that is faster than the dissolution of the multivalent cations in the water flow.

5. The product according to claim 4, wherein the anhydrous liquid in the product is provided in its cooled state in the form of a solid substrate, pellets or as a granulate.

6. The product according to claim 5, wherein the solid substrate, pellets, granules or granulate has a melting point between 20 and 80 degrees Celsius.

7. The product according to claim 1, further comprising a viscosity promoting substance.

8. A method for the removal of organic and/or inorganic contamination from a water stream, comprising the steps of
   a. dosing into the water stream a single product in one dosing step, said product comprising the product according to one of claims 1-5, whereupon the polysaccharide component of the product dissolves in the water stream and adheres to the contamination, the multivalent cation component of the product dissolves in the water stream and cross links with the polysaccharide,
   b. flocculating of the contamination and crosslinked polysaccharide, and
   c. removal of the flocculated contamination from the water stream.

9. The method according to claim 8, wherein the single product dosed into the water stream in one dosing step is a solid product in the form of pellets or granulates, and wherein the water stream has a temperature above the melting point of the solid.

10. The method according to claim 8, wherein the product is dosed into the water stream at a concentration of 1-1000 ppm.

11. The method according to claim 8, wherein the product is dosed into the water stream at a concentration of 1-50 ppm.

12. The method according to claim 8, wherein the product is dosed into the water stream at a concentration of 1-20 ppm.

\* \* \* \* \*